United States Patent
Heacox

(10) Patent No.: US 6,552,270 B1
(45) Date of Patent: Apr. 22, 2003

(54) HARNESS APPARATUS

(76) Inventor: Donald W. Heacox, 2791 Sweet Rd., Jamesville, NY (US) 13078

( * ) Notice: Subject to any disclaimer, the term of this patent is extended or adjusted under 35 U.S.C. 154(b) by 0 days.

(21) Appl. No.: 10/215,118

(22) Filed: Aug. 8, 2002

(51) Int. Cl.[7] ................................................ H01B 3/00
(52) U.S. Cl. ................ 174/71 R; 174/72 A; 174/70 R; 174/135
(58) Field of Search ............................. 174/70 R, 71 R, 174/72 R, 95, 97, 135, 138 E, 156, 197, 72 A, 154, 155, 146

(56) References Cited

U.S. PATENT DOCUMENTS

| | | | |
|---|---|---|---|
| 2,902,821 A | * | 9/1959 | Kelly, Jr. .................... 174/146 |
| 2,983,014 A | * | 5/1961 | Greenwood ................. 174/146 |
| 4,715,571 A | * | 12/1987 | Soltow et al. .............. 174/146 |
| 5,027,478 A | * | 7/1991 | Suhr ....................... 137/355.16 |
| 5,374,778 A | | 12/1994 | Hashimoto et al. |
| 5,534,665 A | | 7/1996 | Long |
| D421,318 S | * | 2/2000 | O'Brien et al. ............ D26/138 |
| 6,051,789 A | | 4/2000 | Kato |
| 6,332,248 B1 | | 12/2001 | Daniggelis et al. |

* cited by examiner

Primary Examiner—Dean A. Reichard
Assistant Examiner—Jinhee Lee

(57) ABSTRACT

A harness apparatus includes a structure with a core and at least two arms extending radially from the core with the arms positioned to define the configuration of the harness. The arms are fixedly attached circumferentially around the core with the arms further including a first and second member. The first and second member loop and fixedly join the carrier means. A carrier means is rigidly attached to the arms with the carrier means containing a retention pocket that deforms for approximating the shape and securing an annular piece. Finally, the configuration bundles at least one annular piece.

8 Claims, 2 Drawing Sheets

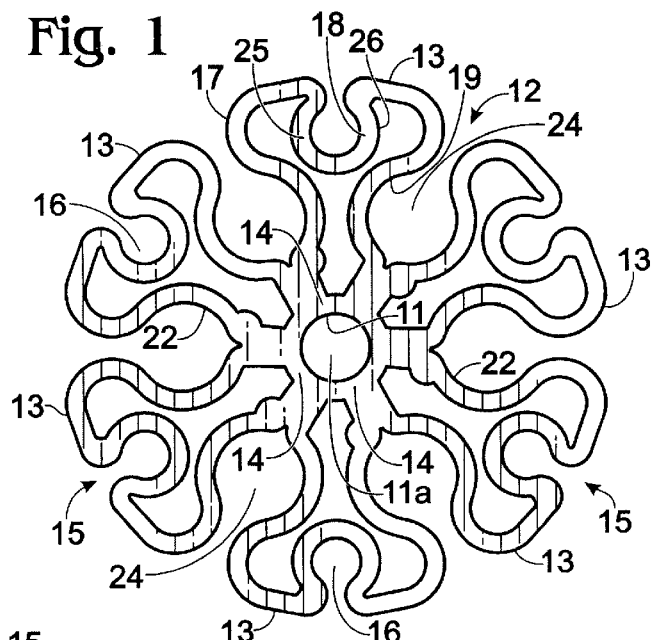
Fig. 1
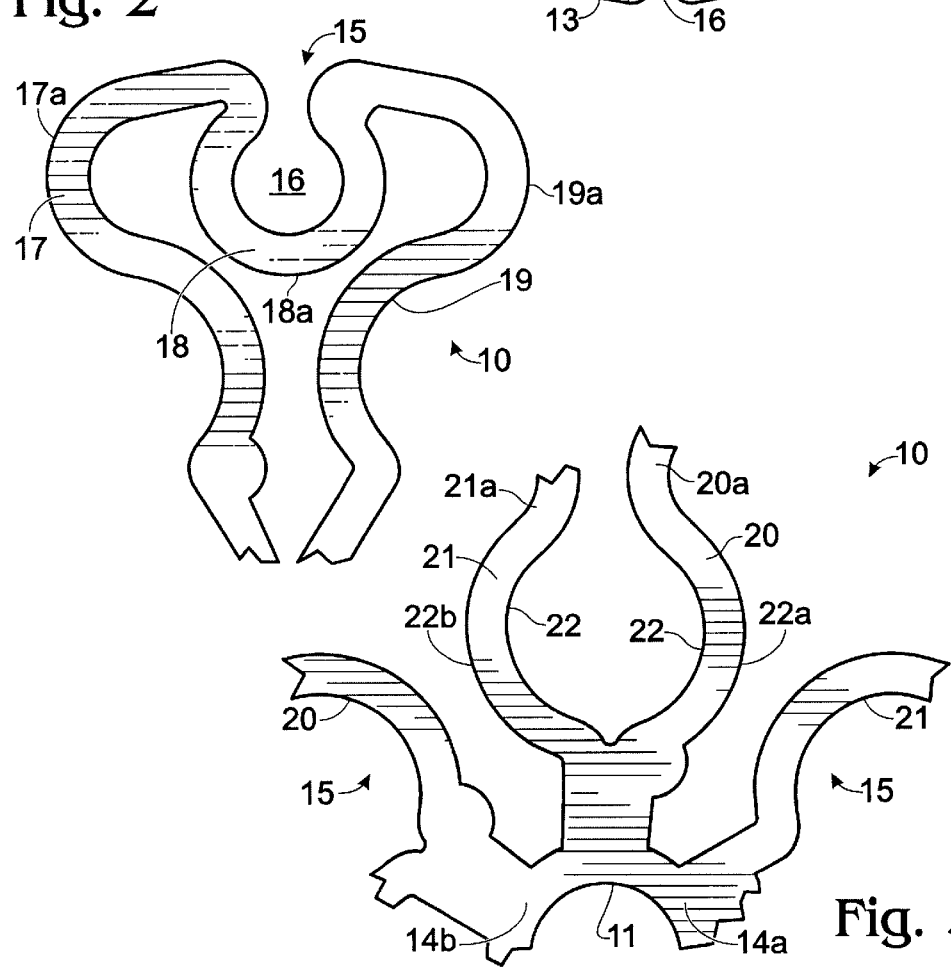
Fig. 2
Fig. 3

HARNESS APPARATUS

FIELD OF THE INVENTION

This invention relates to an apparatus for bundling items together, and more particularly to an annular piece harness that will bundle wires, rope and the like.

BACKGROUND OF THE INVENTION

The current art relating to wire harnesses utilizes several arrangements for routing and protecting wires within any environment. For example, one arrangement uses a plastic braid to provide abrasion protection for the wire or cable and a steel shroud to route the wires or cable within a particular environment. This method tends to be very labor intensive and requires a special braiding machine to encapsulate the wires. Another arrangement uses a duct with detachable fingers for retaining wire or cable within the duct and for facilitating the addition of wires to the bundle. A duct cover may then be placed over the entire duct to retain all the wires or cable. Still another arrangement uses an adjustable clip for retaining wires or cable within a duct. The clip is easily attachable and detachable to the duct walls as well as being adjustable on the duct walls.

The wire harness described in U.S. Pat. No. 5,374,778, entitled "Wire Harness," to Hashimoto et al., is confined to using adhesive tape to bundle together shielded wires having opposite ends connected to connectors. The adhesive tape is not reusable if it is desired to remove the shielded wires from the connectors. New adhesive tape would be required to rebundle the shielded wires.

The apparatus described in U.S. Pat. No. 6,051,789, entitled "Corrugated Tube and Wire Harness Having The Tube As A Cover," to Kato, is not easily adaptable for use by the general consumer to harness wires from a computer or entertainment center. The bundled wires are housed by a corrugated tube which has two end regions circular in cross-section and a central region elliptical in cross-section. When installed, the central region of the wire harness is positioned on the floor such that the projection perpendicular to the floor by the central region of the tube is reduced and results in the harness requiring less space. The tube includes a resilient expansion slit which allows a wire bundle to be inserted in or removed from the tube. However, the tube must be specifically fabricated for its use because one size does not fit all applications.

The method described in U.S. Pat. No. 6,332,248 B1, entitled "Wire Harness Bounding Method," to Daniggelis et al., is elaborate, time consuming and not easily adaptable for use by the general consumer in securing computer wires and the like. The method includes a bundle of wires and a cable tie wherein the cable tie has a strap body and a locking head with first and second strap passages that each have a pawl that locks in the same direction. The strap body is wrapped around at least one of the wires and inserted through the first strap passage. Next the strap body is wrapped around the bundle and inserted through the second strap passage. The strap body is then tightened and the residual strap portion clipped.

Notwithstanding the usefulness of the prior art, they do not provide a simple cost effective means for routing wires or cable in a home or office environment. What is needed is a device that can be easily installed to bundle the wires and the cable together that are ever present in office and home environments because of computers, entertainment centers and the like.

SUMMARY OF THE INVENTION

It is an aspect of the present invention to provide a device that easily bundles wires, ropes and cables together and is inexpensive to the consumer.

It is yet another aspect of the present invention to be able to bundle at least two wires and as many as desired in different embodiments of the present invention.

To accomplish these and other aspects of the present invention a harness apparatus includes a structure with a core and at least two arms extending radially from the core with the arms positioned to define the configuration of the harness. The arms are fixedly attached circumferentially around the core with the arms further including a first and second member. The first and second member loop and fixedly join the carrier means. A carrier means is rigidly attached to the arms with the carrier means containing a retention pocket that deforms for approximating the shape and securing an annular piece. Finally, the configuration bundles at least one annular piece.

These and other aspects of the present invention will become apparent from the following description, the description being used to illustrate the preferred embodiment of the invention when read in conjunction with the accompanying drawings.

BRIEF DESCRIPTION OF THE DRAWINGS

FIG. 1 is a frontal view of the preferred embodiment of the invention.

FIG. 2 is a detail view of the carrier means in the preferred embodiment of the invention.

FIG. 3 is a detailed view of the center region of an arm in the preferred embodiment of the invention.

DETAILED DESCRIPTION OF THE INVENTION

Figure 4:
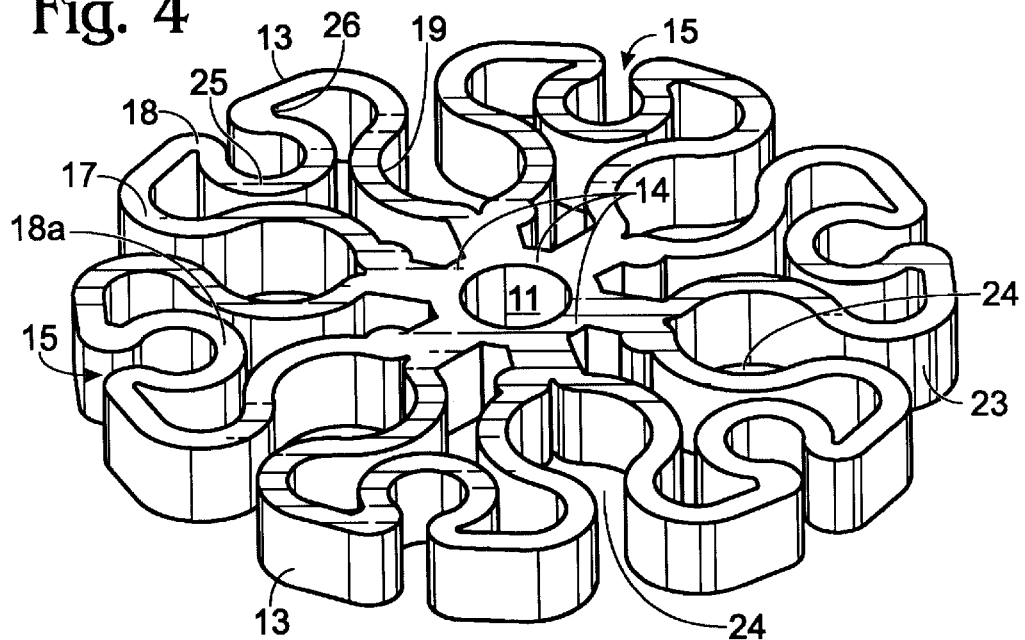
FIG. 4 is an isometric view of the preferred embodiment of the invention.
Figure 5:
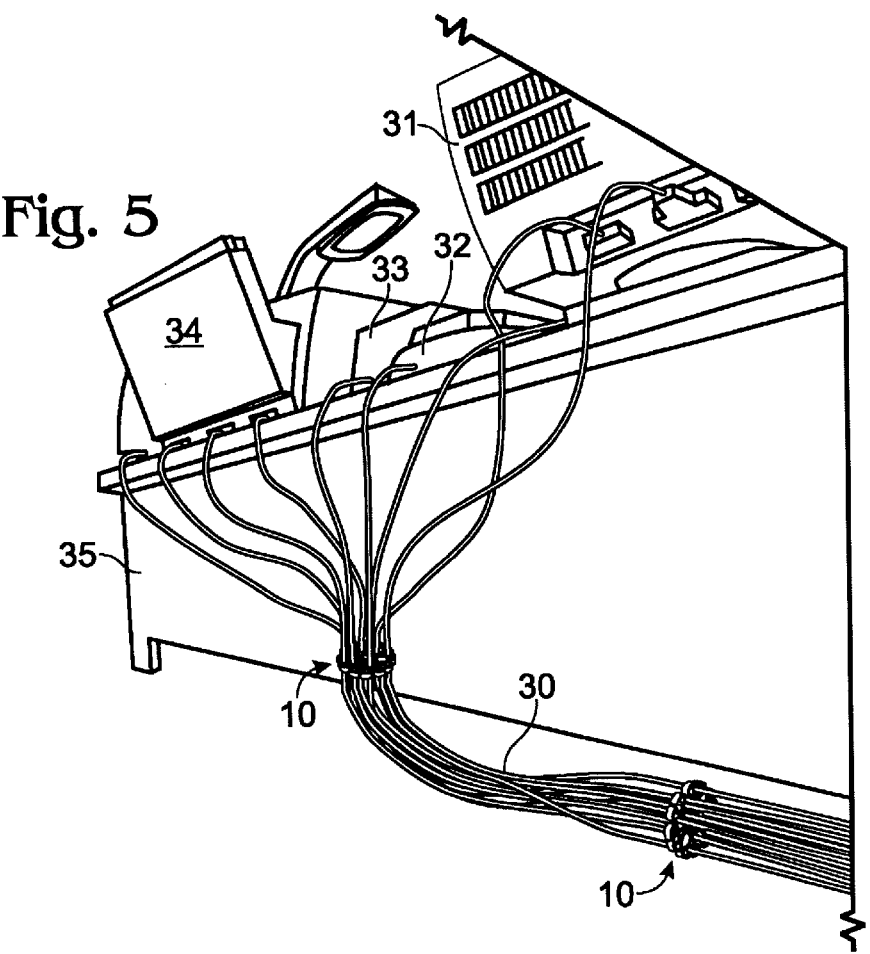

While the present invention is described below with reference to a wire harness, a practitioner in the art will recognize the principles of the present invention are applicable in bundling cable, wire rope, rope and the like.

FIG. 1 shows harness apparatus 10 in the preferred embodiment of the invention. The structure 12 includes a core 11, six arms 15 that are fixedly attached 14 circumferentially around the core 11 and radially extending from the core 11. The arm 15 contains a carrier means 13 and a center region 22. The carrier means 13 is integrally attached to the arms 15. The number of arms 15, that form the configuration of the structure 12, depend upon the desired number of annular pieces 30 to be bundled together. The number of arms 15 may vary, from at least one to as many as desired positioned circumferentially around core 11, defining the configuration of the harness apparatus 10. The arms 15 are positioned around core 11 with a variety of spacing. For example, three arms may be desired and spaced 120° apart, 60° apart or 45° apart. Another design may choose four arms spaced 90° apart or 60° apart. Any configuration is possible and can include as many arms 15 as desired. FIG. 1 shows six arms 15 that are spaced 60° apart. Furthermore, the core 11 is either solid (not shown) or hollow 11a. Finally, the arms 15 can take on any shape or form so long as there is a carrier means 13 to hold annular pieces 30.

The carrier means 13 is integrally attached to the arm 15. The carrier means 13 contains a retention pocket 16 that deforms approximating the shape of and securing an annular piece. As is known by the practitioner in the art, the annular piece can be a number of items including, but not limited to, an electrical wire, a wire rope, a rope, a pipe, tubing, a cable and a wire. The size of the retention pocket 16 depends on the desired size of the annular piece to be bundled together with structure 12. The annular piece is typically circular. Consequently, the retention pocket 16 is constructed in a circular shape to match the shape of the annular piece. Furthermore, the circular annular piece is substitutable for any shape including, but not limited to, square, oval and the like. However, the shape of the retention pocket 16 is constructed in the shape of the annular piece to be used.

The carrier means 13 is formed by a first element 17, a second element 18 and a third element 19 as shown in FIG. 2. The second element 18 contains the retention pocket 16 and its size varies depending the size of the desired annular pieces that will be bundled using structure 12. The retention pocket 16 is formed by an inwardly projecting loop 18a set into the second element 18. This allows a snap-fit connection with the annular piece, that is, snapping into the retention pocket when the annular piece is inserted into the retention pocket 16. Furthermore, the inwardly projecting loop 18a provides a flexible retention pocket as the inwardly projecting loop 18a acts like a spring. This assists in securing and holding the annular piece in the retention pocket 16. The first element 17 is formed with a first outwardly projecting loop 17a. The third element 19 is formed with a second outwardly projecting loop 19a. The first outwardly projecting loop 17a and the second outwardly project loop 19a provide additional flexibility to the carrier means 13. The first element 17, the second element 18 and the third element 19 are integrally joined together making the carrier means 13 that holds the annular piece (not shown). As is known by the practitioner in the art, the carrier means 13 in the preferred embodiment of the invention is substitutable for any shape so long as the retention pocket 16 is capable of holding an annular piece by a snap-fit, that is, snapping into the retention pocket 16.

The structure 12, as shown in FIG. 1, can be either molded or machined depending on the material used in construction such as plastic, rubber, wood and metal. Iin the preferred embodiment of the invention, a plastic is used as the material of choice and the structure is formed through a molding process. Alternatively, metal and wood can be used but the structure would then be formed through a machining and drilling process. Consequently, the perimeter configuration of structure 12 can take the form of many shapes including, but not limited to, circular, polyhedron, rectangular, square and the like. Furthermore, the size of the structure 12 in the preferred embodiment of the invention is about two inches in diameter. Alternately, the two inch diameter is substitutable for a variety of diameter sizes wherein the diameter of the structure 12 is determinable through its application. Finally, as shown in FIG. 4, the thickness 23 of structure 12 is about 0.380" in depth. This thickness is substitutable for a variety of depths depending on the application.

FIG. 3 illustrates an arm 15 of apparatus 10 in the preferred embodiment of the invention. The arm 15 includes a first member 20 and a second member 21. The first member is integrally attached 20a to the third element 19 as shown in FIG. 1. The second member is integrally attached 21a to the first element 17 as shown in FIG. 1. The first member is fixedly attached 14a to the core 11 and the second member is fixedly attached 14b to the core 11. A central region 22 in the first member 20 loops inwardly 22a toward the center of one arm 15 forming a peripheral recess matching one half the perimeter of an annular piece 30. Also, a central region 22 in the second member 21 loops inwardly 22b toward the center of another arm 15 forming a peripheral recess matching one half the perimeter of an annular piece (not shown). The combination of the first member inward loop 22a peripheral recess and the second member inward loop 22b peripheral recess forms a clamp 24.

The clamp 24 is available to hold and secure additional annular pieces. This is because the first member 20 and the second member 21 are flexible as a result of the peripheral recess at their respective center regions 22. The number of clamps 24 available in the structure 12 of apparatus 10 depend on the number of arms 15 positioned circumferentially around the core 11. Consequently, a plurality of the number or arms 15 will determine the number of clamps 24. For example, as shown in FIG. 1 there are six clamps 24 as a result of six successive arms 15 positioned circumferentially around the core 11. Also, the size of individual annular pieces to be held by clamp 24 depends on the radius 15 of the first member inwardly loop 22a and the radius of the second member inwardly loop 22b. As is known by the practitioner in the art, the first member inwardly loop 22a (peripheral recess) is substitutable for two, three or more loops depending on the design of the structure 12. Furthermore, the second member inwardly loop 22b (peripheral recess) is substitutable for two, three or more loops depending on the design of the structure 12. However, the number of loops (peripheral recesses) in each member must be the same and spaced evenly from the core 11 so as to form a multiple number of clamps 24.

FIG. 4 illustrates an isometric view of apparatus 10. The first radius 25 in the carrier means 13 in the preferred embodiment of the invention is about 0.0933" but can vary depending on the design of the first element 17 and the second element 18. Also, the second radius 26 in the carrier means 13 in the preferred embodiment of the invention is about 0.0933" but can vary depending on the design of the second element 18 and the third element 19. The inwardly projecting loop 18a radius will vary and depends on the size of the annular piece (not shown) to be held.

While there has been illustrated and described what is at present considered to be the preferred embodiment of the invention, it should be appreciated that numerous changes and modifications are likely to occur to those skilled in the art. It is intended in the appended claims to cover all those changes and modifications that fall within the spirit and the scope of the present invention.

What is claimed is:
1. A harness apparatus comprising:
a structure with a core and at least two arms extending radially from said core, said arms positioned for defining said harness;
said arms circumferentially radially extending around said core with said arms further comprising a first member and a second member for attaching to a carrier means;
said first and second member loop forming a peripheral recess providing a flexible said first and second member, said first and second member fixedly attached to said core;
said carrier means further comprising a first element, a second element and a third element with said second element forming a retention pocket;
said retention pocket deforms for approximating the shape of and securing an annular piece; and
said structure bundling at least one of said annular piece.

2. The apparatus as claimed in claim 1, wherein said annular piece is a plurality in number.

3. The apparatus as claimed in claim 1, wherein said annular piece is held in place by said carrier means by snapping into said retention pocket.

4. The apparatus as claimed in claim 1, wherein said second element is formed into an inwardly loop that is flexible, allowing positioning of a plurality of sizes of said annular piece.

5. The apparatus as claimed in claim 1, wherein said core is selected from the group consisting of hollow and solid.

6. The apparatus as claimed in claim 1, wherein said first and second member are flexible.

7. The apparatus as claimed in claim 1, wherein said first and second member further consists of a central region that loops forming a peripheral recess matching one half the perimeter of said annular piece.

8. The apparatus as claimed in claim 1, wherein a plurality of said first and second members of said arm are positioned circumferentially around said core so as to form a a clamp between successive said first and second members.

* * * * *